United States Patent [19]

Thrower et al.

[11] Patent Number: 4,748,655
[45] Date of Patent: May 31, 1988

[54] PORTABLE TELEPHONES

[75] Inventors: Keith R. Thrower; Peter J. Munday; Trevor M. Gill, all of Reading, England

[73] Assignee: Racal Research Limited, Berkshire, England

[21] Appl. No.: 758,359

[22] Filed: Jul. 24, 1985

[30] Foreign Application Priority Data

Jul. 25, 1984 [GB] United Kingdom ................ 8419003

[51] Int. Cl.[4] .............................................. H04Q 7/04
[52] U.S. Cl. ....................................... 379/60; 379/57; 379/58
[58] Field of Search ................ 179/2 E, 2 EA, 2 EB, 179/2 EC; 379/59, 60, 58, 61, 63; 485/56; 240/539

[56] References Cited

U.S. PATENT DOCUMENTS

| | | |
|---|---|---|
| 3,586,978 | 6/1971 | Van Gorder . |
| 3,906,166 | 9/1975 | Cooper et al. .......................... 379/60 |
| 3,955,140 | 5/1976 | Stephens et al. ................. 455/58 X |
| 4,334,315 | 6/1982 | Oro et al. ............................ 455/11 |
| 4,467,140 | 8/1984 | Fathauer et al. . |
| 4,538,028 | 8/1985 | Gazzoli et al. .................... 179/2 EA |
| 4,539,706 | 9/1985 | Mears et al. ....................... 455/58 X |
| 4,553,262 | 11/1985 | Coe .................................... 179/2 EB |
| 4,659,878 | 4/1987 | Dinkins ................................ 379/68 |

FOREIGN PATENT DOCUMENTS

| | | |
|---|---|---|
| 0041289 | 12/1981 | European Pat. Off. . |
| 0188322 | 7/1986 | European Pat. Off. . |
| 2950387 | 6/1981 | Fed. Rep. of Germany ...... 340/539 |
| 0044233 | 4/1981 | Japan ..................................... 379/59 |
| 0033331 | 2/1983 | Japan ..................................... 379/60 |
| 0034635 | 3/1983 | Japan ..................................... 379/61 |
| 0081352 | 5/1983 | Japan ..................................... 379/61 |
| 0204640 | 11/1983 | Japan ..................................... 379/58 |
| 0027636 | 2/1984 | Japan ..................................... 379/63 |
| 0236335 | 11/1985 | Japan ..................................... 379/58 |
| 83/02380 | 7/1983 | PCT Int'l Appl. . |
| 84/00654 | 2/1984 | PCT Int'l Appl. . |
| 85/02738 | 6/1985 | PCT Int'l Appl. . |
| 1461624 | 1/1977 | United Kingdom . |
| 2162404 | 1/1986 | United Kingdom ................. 379/59 |

OTHER PUBLICATIONS

Kikuchi et al, "Tunnel Relay System for Automobile Telephone System in an 800 MHz Band", *Japan Telecommunications Review*, 4/80, vol. 22, No. 2.

Lineback, J. Robert, "Cellular Line is Step to Portable Office", *Electronics*, Jun. 28, 1984, pp. 48–50.

Ehrlich, "Cell–Site Hardware", Bell System Technical Journal, vol. 58, No. 1, (Jan. 1979), 153–99.

Free, "36 Cellular Phones", Popular Science, Aug. 1985, 78–80.

Kobayashi, "Detatchable Mobile Radio Units for the 800 MHz Land Mobile Radio System", 34th IEEE Vehiculal Tech. Conf., (21 May 84), 6–11.

MacDonald, "The Cellular Concept", Bell System Technical Journal, vol. 58, No. 1, (Jan. 1979), 15–41.

Young, "Advanced Mobile Phone Service: Introduction, Background, and Objectives", Bell System Technical Journal, vol. 58, No. 1, (Jan. 1979), 1–14.

Fisher, "Advanced Mobile Phone Service: A Subscriber Set for the Equipment Test", Bell System Technical Journal, vol. 58, No. 1, (Jan. 1979), 123–143.

Arthur C. Stocker, "Small–Cell Mobile Phone Systems", IEEE Transactions of Vehicular Technology, vol. VT-33, No. 4, Nov. 1984, pp. 269–275.

*Primary Examiner*—Robert Lev
*Attorney, Agent, or Firm*—Leydig, Voit & Mayer

[57] ABSTRACT

A personal portable telephone (11) allows the user access to the cellular radio network via a number of different gateways including a communal unit (15, 16), user's mobile telephone set (9), home telephone (13) or office PABX (14). The telephone (11) can also be used as a paging unit for use within the cellular radio network. The communal radio unit (15) is a multi-channel arrangement capable of servicing a large number of personal telephones within its service area which is small compared to that of a normal cellular radio cell. Communal units (15) may be transportable and located in public areas such as railway stations, airports and on trains or coaches. The telephone (11) automatically transmits its identification number to a gateway (9, 13, 14, 15, 16) when it enters its service area enabling the subscriber to be accessed by callers without their knowing his whereabouts.

13 Claims, 3 Drawing Sheets

FIG. I.

PORTABLE TELEPHONES

BACKGROUND OF THE INVENTION

1. Technical Field

The present invention relates to communications systems using portable telephones and more particularly to a system whereby portable telephones can readily be used in conjunction with a cellular radio network. Such cellular radio networks are now in operation in the United Kingdom.

2. Prior Art

Cellular radio networks of various types have been described by which a radio telephone service can be provided to a large number of mobile subscribers using a relatively small number of frequencies, by dividing the service area into a number of cells and reusing the frequencies in non-adjacent cells. One such system is described in Bell Systems Technical Journal Volume 58 January 1979 No. 1, particularly in papers entitled "Advance mobile phone service: Introduction, Background and Objectives" by W. I. Young and "The Cellular Concept" by V. H. MacDonald.

In order to provide the necessary power for a resonable period of operation, it is usually necessary for a mobile radio telephone unit to include relatively large batteries which are both bulky and heavy. While such batteries can be readily mounted in a vehicle, it is not practicable with present mobile telephones to provide a truly portable unit.

The mobile radio telephone unit also has to perform complex procedures in order to register with its closet base station and communicate with the base station in order to receive, set up or hand-off a call. The necessary equipment for carrying out these functions is complex and expensive.

British Patent Specification No. 1461624 suggests an arrangement in which portable radio telephone units can operate at very low power and therefore use smaller and lighter batteries. In this system a number of receiver stations are located throughout each cell and relay the low strength received signals from the portable telephones to the main transmitting cell site. Apart from its low power the proposed portable radio telephone has to perform all the other functions of a normal vehicle mounted type of cellular radio telephone unit.

SUMMARY OF THE INVENTION

An object of the invention is to provide a low cost, lightweight portable telephone capable of being used as a terminal in a cellular radio network.

A further object of the invention is to enable a user to be accessed by means of his portable telephone virtually irrespective of his location and without the requirement for a caller to know the whereabouts of the called party.

The present invention provides an overlay communication system for use in conjunction with an existing cellular radio telecommunications network of the type which includes a network control and a number of base stations. The overlay system is made up of a distributed array of gateway devices that communicate like terminals of the cellular radio network with base stations. Portable telephones communicate with base stations via a gateway device rather than directly to the base stations. When a portable telephone is switched on, it transmits its identification number to the nearest gateway device. The gateway device then transmits the identification number onward to the network control via a base station. The cellular network then treats the gateway device as that subscriber's terminal so that the use of such an overlay network does not require any modification to the cellular network.

Preferably the gateways with which such a telephone is capable of communicating comprise a mobile cellular radio telephone capable of handling one call at a time to which access is restricted to a portable telephone having a predetermined or one of a set of predetermined identification numbers, or a multi-channel cellular radio unit capable of handling a plurality of calls in parallel.

In a preferred embodiment the portable telephone can also communicate with gateways to the public switched telephone network (PSTN). Such gateways may comprise a private telephone including a radio transmitter/receiver for communication with a portable telephone, access to such a gateway telephone being restricted to a portable telephone having a predetermined or one of a set of predetermined identification numbers, or a PABX including a radio transmitter/receiver for communicating with at least one portable telephone.

By reducing the power and the processing ability of the portable telephone unit to a minimum for carrying out the required functions it is envisaged that the device will provide a compact, low weight, low cost, personal terminal.

More specifically, the present invention provides a communications system for a plurality of subscribers each having a portable telephone, a plurality of gateways distributed over the service area adapted to communicate with base stations or switching centres of a cellular radio network in accordance with the standard protocol of that network, and with said portable telephones by means of a plurality of fixed channels, each telephone having a subscriber identification number which is transmitted over a channel to the gateway when the telephone enters the service area of that gateway and is registered via the gateway with the cellular radio network to establish the location of the telephone subscriber for receipt of calls.

Preferably the system further comprises means for issuing a paging call to a subscriber whose number is not currently registered with the network.

The plurality of fixed channels between the telephones and the gateways may be established as time slots of a single frequency, as separate frequencies, or by code division multiple access.

DESCRIPTION OF PREFERRED EMBODIMENTS

Figure 1:
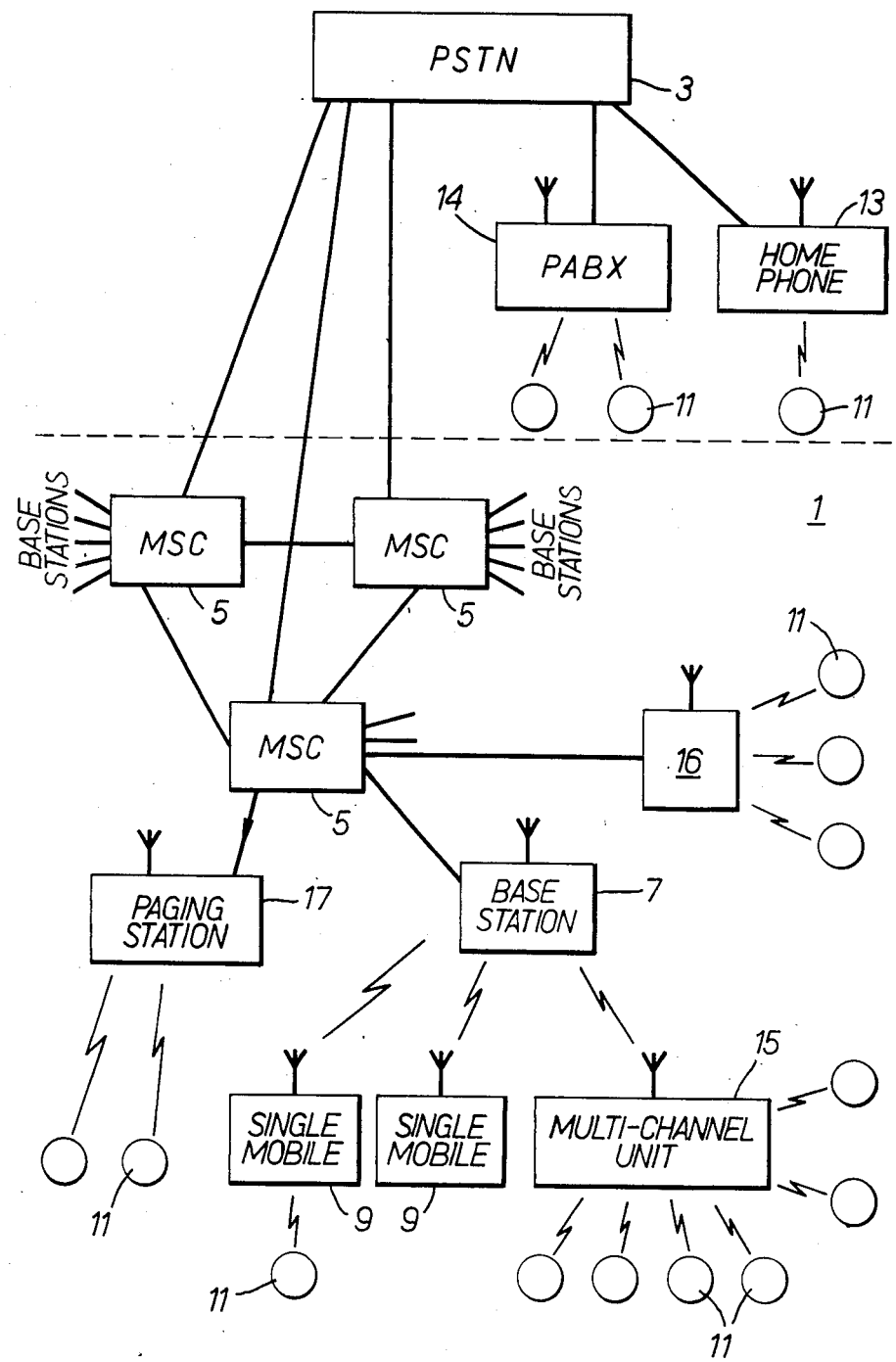
FIG. 1 is a block diagram showing the system and its relationship with a cellular radio network and the public switched telephone network (PSTN)

In FIG. 1 reference numeral 1 indicates a cellular radio network which is linked into the public switched telephone network 3 (PSTN). The cellular radio network is made up of one or more interconnected exchanges or mobile switching centers (MSC) 5 which are each also connected directly into the PSTN 3.

Each MSC 5 is connected to a number of base stations 7 each of which serves a surrounding cell. The interconnections between the base stations, MSCs and PSTN are via land lines.

Each base station 7 has a set of radio transmitters and receivers operating at the frequencies allocated to that station so that the station can communicate with mobile telephone sets 9 within its cell. All the network subscribers in the area of a cell served by the base station register their identification numbers with the base station when their sets are turned on. The base station in turn sends this information to the network control which may be located at an MSC. The location of the subscriber is then known to the network so that if a call is received for that subscriber or the subscriber wishes to make a call, then a procedure is initiated using a control channel to set up a radio link at one of the frequencies allocated to that cell in which the subscriber and the base station are located. The remainder of the link between the subscriber and the called or calling party is established via the MSC 5 linked to the base station and then either directly or via one or more other MSCs into the PSTN.

The system described so far is a conventional cellular radio system, in which the subscriber has his own mobile radio telephone set 9 with sufficient power to communicate with the base station 7 whatever his position in the cell served by that base station. In many situations the subscriber may wish to leave his vehicle without being deprived of the facility of still receiving and making calls via his mobile radio telephone set. In order that he may do this it is now proposed that a very low power radio link be set up between his vehicle equipment and a low-cost, pocket-sized, radio telephone 11. The telephone 11 would have a short range of 300 m or less and operate at a power of less than 10 mW. Such a power output could be maintained for a resonable period of normal operation, say 24 hours, from compact batteries. The telephone 11 to be described is intended to be operable to various other devices to be described in more detail later, to provide a comprehensive communications service to the subscriber whatever his whereabouts. Such devices will be referred to herein as gateways. In the above example the telephone 11 is using the mobile radio telephone set 9 as its gateway into the cellular radio network.

When being used to communicate over a short range with the subscriber's own mobile set only a single channel is required. However for communication with other gateways it is necessary for the telephone 11 to be able to operate on any of several channels and therefore the telephone 11 uses a predetermined one of these channels for this communication. The much higher power transmission between the mobile equipment and the base station would be at the allocated frequency of that station's set of frequencies.

Such an arrangement would operate in a similar manner to the so-called cordless telephones which are available for use directly with the PSTN. In such a cordless telephone the subscriber has a phone unit 13 directly connected to his local PSTN exchange. The unit 13 also acts as a receiver and transmitter at a single frequency for use with a small hand held telephone 11 over a very restricted range of one hundred meters or less of the telephone unit itself.

The portable personal telephone 11 is capable of use with the subscriber's home telephone unit 13 as a gateway as well as with his mobile radio telephone. Similarly PABXs 14 may be designed so as to be able to communicate with portable telephones. The home telephone 13 or PABX 14 must be adapted by the provision of a low power transmitter/receiver for communication with the portable telephone(s). In the case of a PABX multiple channels are needed so that the PABX may simultaneously handle several calls in parallel to personal telephones. When a home telephone unit 13 or a PABX 14 is being used as a gateway into the cellular radio network, it may be provided with an optional feature whereby the telephone unit 11 when within range of either such gateway to which it is permitted access, automatically causes a telephone call to be made to the cellular network control at an MSC to register its identification number with the network as being located at the relevant PSTN number. This enables incoming calls via the cellular radio network to be routed to the subscriber via that PSTN number.

Multiple channels between a gateway and the personal telephone 11 may be established by time division multiplexing, by the use of several frequency channels or by code division multiple access. The use of time slots to define the required channels is presently preferred so that the telephone need only be capable of operating at a single frequency. In one embodiment all channels are sequentially monitored by the telephone to enable the telephone to select a free channel for communication with a multiple channel gateway or identify calls for it on any of the channels. In another embodiment, one or more channels are identified for use for control purposes only. One of these control channels is used for the transmission of the subscriber's identification number to the gateway for registration in the cellular radio network when the subscriber enters the service area of the gateway. In the case of adjacent gateways where the service areas may overlap the gateways each use a different control channel. The non-control channels are shared out between the gateways, the service areas of which overlap. A telephone located within the overlapping service areas locks onto the control channel on which it receives a stronger transmission and sends its identification number into the cellular network via that gateway so that all outgoing and incoming calls for the telephone are routed through that gateway exclusively. The control channel is also used by the gateway to indicate to the telephone which channel should be used to take or make a call on. In the first-mentioned embodiment, this information is sent on the first available free channel with the gateway and telephone continuously monitoring all channels for such control information.

The personal portable telephone 11 may also be used by the subscriber when neither at home or close to his own mobile radio telephone set 9 if he has one. such use may be required when the subscriber is travelling by train or coach, is in a public place such as a station, airport, hotel, office, conference or exhibition center. In order to allow subscribers to use the cellular radio network when in such places, it is proposed to provide a gateway comprising a communal multi-channel radio telephone unit 15 that can be accessed simultaneously by a number of subscribers over their personal portable telephones 11. When switched on the service area of such a gateway, the portable telephone 11 transmits to the nearest communal radio telephone unit 15 its identification number. This number is then stored in the communal telephone unit 15 and forwarded with its location to a network control at an MSC of the cellular radio network so that the subscriber can send and receive calls as if the communal unit 15 was effectively his personal radio telephone set. In order to service a large number of subscribers, the communal unit is capable of establishing a number of channels at different frequencies with its associated base station. The communal radio equipment may be transportable so that it can be temporarily moved to sites where subscribers require service over a relatively short period such as during a conference.

For permanent locations, such as stations and airports, where a high density of personal telephone subscribers is envisaged, a gateway 16 is provided. The gateway 16 is identical to the communal telephone unit 15 referred to above and described more fully later except that it is directly connected to an MSC 5 via a land line instead of transmitting to a base station using the standard cellular network protocol. The land line link with the MSC can carry a number of calls simultaneously. The identification numbers of subscribers using the device 16 as their gateway into the network are sent via the land line to the network control at the MSC.

A further function of the portable personal telephone 11 is for paging purposes. For example where a subscriber does not have or is not close to a mobile unit 9 of his own and is not close to another gateway such as a communal unit 15, a home telephone 13, or PABX 14, or device 16, his telephone 11 can operate as a paging receiver to receive transmissions from a paging station 17. Because of its low power the telephone 11 would not be able to communicate back to the paging station by voice. However, if the data rate is kept sufficiently low then a short digital transmission can be made back to the paging station which, could, for example, transfer it to the sender's electronic mailbox. Paging would be automatically employed if the subscriber's identification number was not registered with the cellular radio network as within the service area of any of the previously described gateways, 9, 13, 14, 15, 16. If a paging call failed then it would be probable that the subscriber had turned his telephone off.

Figure 2:
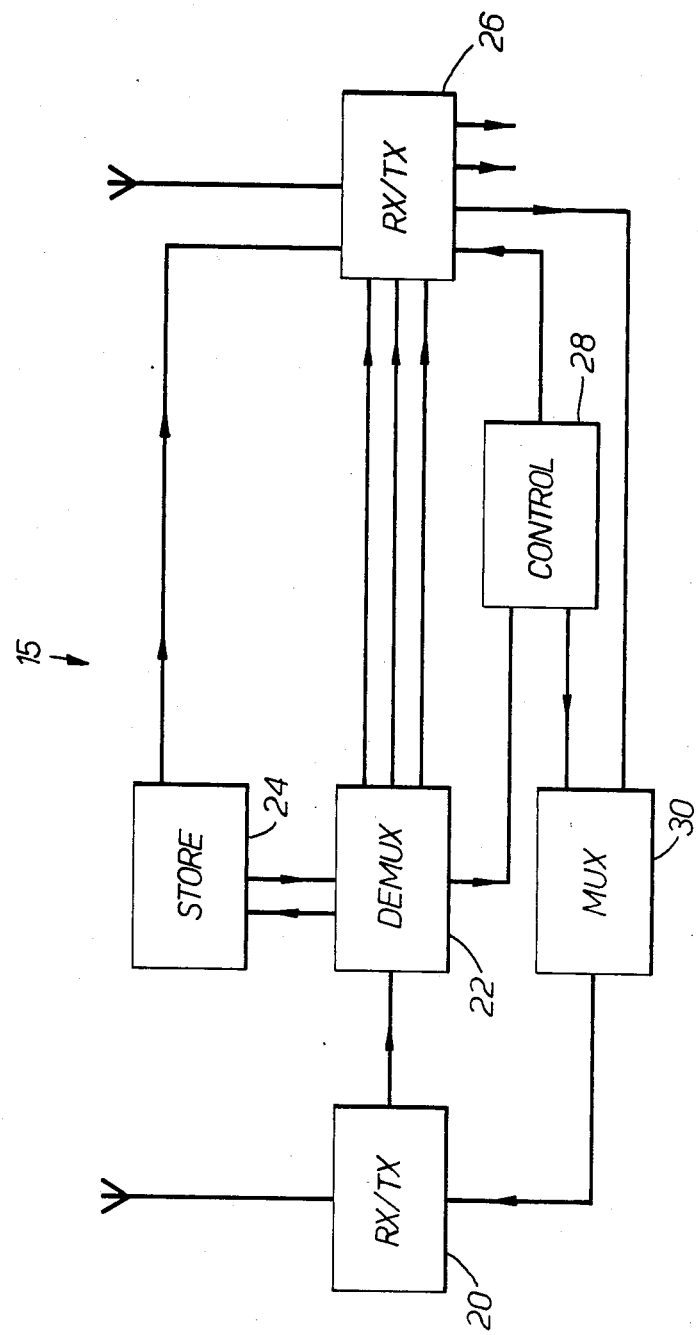
FIG. 2 is a block diagram of a multi-channel radio gateway for use in the system of FIG. 1.

FIG. 2 shows in more detail a communal multi-channel radio telephone unit 15. Similar logic would be required for the PABX 14 and device 16. The unit 15 comprises a first multi-channel receiver/transmitter 20 which communicates with the various personal telephones 11 within the service area of the unit 15. The receiver/transmitter 20 passes the received signal to a demultiplexer 22 which distinguishes the various transmissions from each of the telephones 11 transmitting at a particular time. The telephones 11 are each capable of transmitting on a number of fixed channels. Since the telephones 11 are only transmitting at low power, the frequency or frequencies used to provide these channels may be common to all portable telephones and not related to the frequency set of the cell in which the telephone is operating. One of the personal telephone channels is allocated as a control channel frequency for communicating with the receiver/transmitter 20 the identification number of the personal telephone 11 concerned. These numbers are recognised by the demultiplexer 22 and passed to a store 24 which is capable of storing all the identification numbers of the personal telephones 11 switched on in its service area. These numbers are passed from the store 24 to a second receiver/transmitter 26 which communicates this information over the control channel to the base station of the cell in which the communal unit is located in the same manner as a single-user radio telephone set communicates with its base station when switched on. This permits the network to be aware of the subscriber's location for receipt of calls.

When a personal telephone 11 in the service area of the unit 15 wishes to make a call it transmits over the control channel to the receiver/transmitter 20 its request and the number to be called. This information is processed in a control unit 28 which is similar to the apparatus provided in a conventional mobile cellular radio telephone set 9, except that the apparatus may be duplicated so that it is capable of dealing with a number of requests in parallel. The control 28 transmits over the control channel to the base station 7 via the receiver/transmitter 26 and receives the necessary information back from the base station concerning the frequency to be used in communication between the receiver/transmitter 26 and the base station. The control 28 also allocates a free channel on which communications may be carried out between the unit 15 and the personal telephone 11 via the receiver/transmitter 20. The two frequencies being used to deal with a particular call between the telephone and unit 15, and between the unit 15 and the base station 7 are not the same. Further communications between the personal telephone 11 and the called party are then carried out on the allocated channels. The signal from the personal telephone passes through the receiver/transmitter 20 via demultiplexer 22 to the receiver/transmitter 26 where it is transmitted to the base station 7 in the manner conventional to the cellular radio network and then via one or more MSCs 5 into the PSTN to the called party. Return transmissions are received from the base station 7 via the receiver/transmitter 26 and are passed via a multiplexer 30 to the receiver/transmitter 20 where they are transmitted on the appropriate frequencies to the personal telephones 11 being served. All the communications between the gateway 15 and the base station 7 are in accordance with the standard protocol of the cellular radio network. Thus, if the network has a different standard protocol from that outlined above, this will be followed as normal.

The multiplexer 30 and demultiplexer 22 may also be adapted to carry out the required frequency changes necessary to convert from the frequency being used for communication with the base station and the frequency on which a personal telephone is operating.

If the communal unit 15 is located in a moving vehicle, such as a train or a coach, then the calls being processed between it and the cellular radio base station are handed off in the normal manner as unit 15 approaches a cell boundary. This handing off does not affect the channels being used for the transmissions between the personal telephones 11 and the receiver/transmitter 20. It will be appreciated that the telephone 11 does not need to be able to hand-off calls as it always uses the same gateway for the duration of a call. The telephone also uses the same fixed set of channels whichever gateway is being used.

The gateways 16, 14 and 9 are essentially similar in their mode of operation to that described above. In device 16 the receiver/transmitter 26 is replaced by a direct land line link to an MSC. In PABX 14 the receiver/transmitter 26 is replaced by a land line link via the PSTN. In the single mobile 9 the multiplexer and demultiplexer are unnecessary as the mobile is only used as a gateway by a single subscriber.

Figure 3:
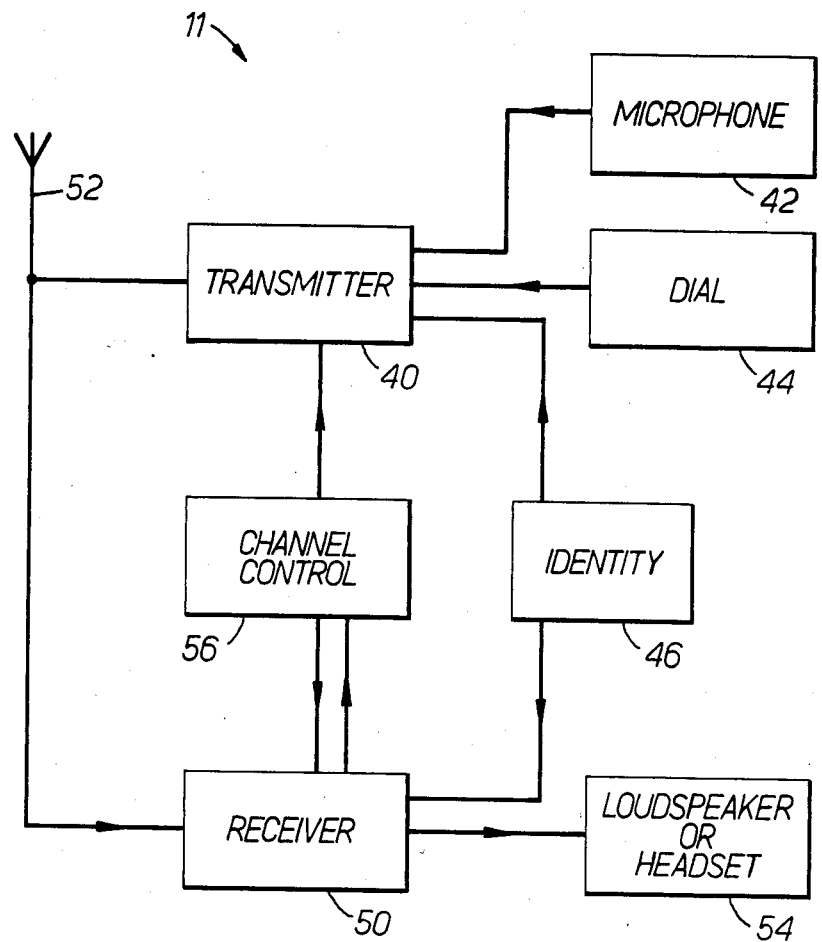
FIG. 3 is a block diagram of a personal portable telephone.

A personal telephone 11 will now be described in more detail with reference to FIG. 3 of the accompanying drawings. The telephone 11 has a transmitter 40 which transmits signals from a microphone/voice encoder unit 42, and also from a dial or keyboard unit 44. Further, when the telephone 11 is switched on it automatically transmits its identification number to the gateway 9, 13, 14, 15, 16 in the service area of which it is located. This number is stored in a store 46. The telephone 11 also includes a receiver 50 connected to an antenna 52. The antenna 52 is also connected to the transmitter 40. The received signals are fed from the receiver 50 to a unit 54 which converts the received signals into an analogue output which is made audible to the telephone user via an earpiece comprising a loud speaker, a headset or earplug arrangement.

Both transmitter and receiver are operable under the control of a channel control unit 56 so that the control channel (where provided) is monitored when the telephone is not being used for a call, or, where there is no specific control channel, transmissions on all channels are continuously scanned. It is not necessary for the user to know exactly where gateways are sited as when the telephone is switched on its identification number is automatically transmitted to any gateway 9, 13, 14, 15, 16 which can receive the signal. If several gateways are accessible to the telephone, they will be using different control channels, and the telephone registers via the gateway with the strongest control channel signal. The gateway may acknowledge reception. A telephone unit 13 or PABX 14 may be programmed to accept only certain identification numbers so that other telephones within the service area will not have their numbers acknowledged or passed to the network. An indicator may be provided on the telephone 11 to indicate to the user whether he is close enough to a gateway in order to make or receive a call, otherwise the telephone 11 will be capable only of operating into the cellular network via the paging system.

When a user of the personal telephone 11 wishes to set up a call he uses the dial or keyboard 44 to enter the required number. This is then transmitted digitally to whichever gateway is in range on the control channel or a free channel. In return, after the gateway has set up the call with the base station of the local cell or with the MSC or PSTN depending on the type of gateway, the telephone 11 will receive a transmission on the control channel allocating one of the channels available to the telephone 11 to be used for further communication. This information is decoded by the receiver 50 and passed to the channel control unit 56 which thereafter switches both transmitter and receiver from the control channel to the allocated channel frequency for the telephone call. Where there is no control channel, the same channel is used for the call.

The channels between the personal telephones 11 and the communal unit 15 may be defined by frequency multiplexing, code division multiple access or time multiplexing. In the last case one time slot of the time multiplexing frame will be used as a control channel and the remaining time slots as communications channels. In order that a telephone 11 should only receive the time slots intended for it, the signal in each time slot could be preceded by an identification code related to the user's identification number. In this case the identification number store 46 is connected to the receiver so as to gate to the loud speaker unit 54 only the contents of the time slots preceded by that telephone's identification number.

For paging purposes, the keyboard or dial 44 may be used to pass a low bit rate digital message back to the paging station 17.

When another telephone user wishes to make a call to a subscriber who owns a personal telephone 11, then he may do this by making a call via the cellular network which will route the call to the MSC and from there to the appropriate gateway either via the cellular network or the PSTN according to the information received about the subscriber's location when the identification number was registered with the network control. If the called subscriber is out of range of one of the gateways 9, 13, 14, 15, 16 then the caller will receive an indication that it is only possible to make a paging call. In this way some communication can always be made to a user of a personal telephone 11 despite the fact that he only possesses a much cheaper and less sophisticated unit than a full mobile radio telephone set. This, therefore, makes the cellular radio network accessible to a much larger range of users. Where a PABX 14 or home telephone, which has not been provided with the facility of making a call to the network control to register the identification number of a telephone 11 in its service area as at its PSTN number, is being used as the gateway for the telephone of the called subscriber, the calling party will have to make a call directly to the PSTN number where he believes the subscriber may be located. Such a call has a lower probability of making contact with the subscriber.

It will be appreciated that, although the personal telephone 11 has been described as being capable of operating to a large number of gateways, it is only necessary for the purposes of the invention for the telephone to be capable of communicating with one gateway such as a communal unit 15. Use with additional gateways, however, allows the telephone 11 to be used as a multi-purpose unit at very little extra cost and therefore makes it necessary for the user to carry about his person only one unit which will enable him to access many information technology systems now available to the public. It will also be appreciated that with the simple addition of a small display and appropriate circuitry, the telephone can also be made to operate in calculator and clock modes.

As well as being used for voice communications the telephone 11 could be adapted to transmit and receive data.

We claim:

1. A communications system for use in conjunction with an existing cellular radio telecommunications network, having a network control, and a plurality of base stations each servicing a cell, said system including a plurality of gateway devices, each gateway device including a transmitter, a receiver, a memory, and control means operatively connected to said transmitter, receiver and memory to provide two way radio communication with said network control via a base station, and a plurality of portable telephones, each having a memory for an identification number and a transmitter and a receiver operative when said portable telephone is in an "on" state to provide two way radio communication on a plurality of fixed channels at low power with said transmitter and receiver of any said gateway device within range, and through said device to a said base station of the cell within which said gateway device is located, each said portable telephone when in said "on"

state and in the vicinity of a said gateway device being operative to transmit its identification number from its memory to said gateway device, said control means of said gateway device being operative to store said identification number in said memory of said gateway device, and to transmit said identification number to said network control via a said base station, said control means of the gateway device thereafter being operative as a control for the portable telephone for setting up and handling off calls for the portable telephone, all communications between the portable telephone and the gateway device while the portable telephone is in an "on" state being carried out on a single fixed channel of said plurality of channels, said portable telephone and gateway device only being operable together as a conventional terminal of said existing cellular radio telecommunications network.

2. A system according to claim 1, in which each said gateway device to the cellular radio telecommunications network includes either a mobile cellular radio telephone capable of handling one call at a time, to which remote access is restricted to a said portable telephone having a predetermined or one of a set of predetermined identification numbers which are stored in said memory of said gateway device, or a multi-channel cellular radio unit capable of handling a plurality of calls into said network in parallel.

3. A system according to claim 2, in which at least one said gateway device is a multi-channel cellular radio unit which includes a first receiver/transmitter adapted to simultaneously communicate with a plurality of said portable telephone each over a predetermined one of said fixed channels, a second receiver/transmitter adapted to communicate via a radio link with said cellular radio telecommunications network in accordance with the standard protocol of said cellular radio telecommunications network, or via a land line link with the cellular radio telecommunications network, a multiplexer for multiplexing the received signals from said second transmitter/receiver and passing the output to said first transmitter/receiver for transmission on said fixed channels to the respective portable telephones, a demultiplexer for demultiplexing the signal received by the first transmitter/receiver and passing the signals to said second transmitter/receiver, and control means for controlling the operation of said transmitter/receivers and said multiplexer and demultiplexer.

4. A system according to claim 1 further including at least one gateway device to a public switched telephone network, with which at least some of said portable telephones are operative to establish two way radio communication.

5. A system according to claim 4, in which said gateway device to the public switched telephone network includes either a private telephone connected to its own telephone line, said private telephone including a radio transmitter/receiver for communication with a portable telephone, remote access to such a private telephone being restricted to a portable telephone having a predetermined or one of a set of predetermined identification numbers, or a PABX including a radio transmitter/receiver for communication with at least one portable telephone.

6. A system according to claim 5, in which said private telephone or said PABX further includes means for automatically making a call to said network control when a portable telephone enters its service area so as to register the identification number of said portable telephone with the network control.

7. A system according to claim 1 further including means for making a paging call to a portable telephone the identification number of which is not currently registered with said network control.

8. A communications system for use in conjunction with a cellular radio telecommunications network having a network control, a plurality of base stations and switching centers with a standard communications protocol, a plurality of subscribers each having a portable telephone, said system including a plurality of distributed gateway devices each defining a service area and having a transmitter/receiver operative to communicate with said base stations or said switching centers of said cellular radio telecommunications network in accordance with said standard protocol, and with said portable telephones by means of at least one channel, each said telephone having a memory containing a subscriber identification number which is transmitted over a channel to a said gateway device when the telephone enters said service area of that gateway device and is registered via the gateway device with said network control of said cellular radio telecommunications network to establish the location of the portable telephone subscriber for receipt of calls, said portable telephone and gateway device only being operable together as a conventional terminal of said existing cellular radio telecommunications network.

9. A system according to claim 8, further including means for issuing a paging call to a subscriber whose number is not currently registered with said network control.

10. A system according to claim 1, in which said plurality of fixed channels between the portable telephones and the gateway devices are provided by time division multiplexing at a single frequency, as separate frequencies, or by code division multiple access.

11. A system according to claim 1, in which each said portable telephone further includes a channel control means for setting the receiver and/or transmitter to a channel, a microphone and dialling means associated with said transmitter, and an earpiece.

12. A system according to claim 1, in which at least one of said fixed channels is a control channel to which the telephone is connected when idle or setting up a call.

13. A system according to claim 12, in which the portable telephone further includes means for communication with the gateway device from which it receives the strongest transmission on the control channel.

* * * * *